(12) United States Patent
LePort et al.

(10) Patent No.: US 9,692,025 B2
(45) Date of Patent: Jun. 27, 2017

(54) BATTERY CAP ASSEMBLY WITH HIGH EFFICIENCY VENT

(71) Applicant: Tesla Motors, Inc., Palo Alto, CA (US)

(72) Inventors: Francisco LePort, San Francisco, CA (US); Scott I. Kohn, Redwood City, CA (US); Orion A. King, Menlo Park, CA (US); Alex Prilutsky, Redwood City, CA (US)

(73) Assignee: TESLA, INC., Palo Alto, CA (US)

( * ) Notice: Subject to any disclaimer, the term of this patent is extended or adjusted under 35 U.S.C. 154(b) by 0 days.

(21) Appl. No.: 14/973,644

(22) Filed: Dec. 17, 2015

(65) Prior Publication Data

US 2016/0104875 A1   Apr. 14, 2016

Related U.S. Application Data

(62) Division of application No. 13/567,876, filed on Aug. 6, 2012, now Pat. No. 9,252,400.

(Continued)

(51) Int. Cl.
*H01M 2/02* (2006.01)
*H01M 2/12* (2006.01)
(Continued)

(52) U.S. Cl.
CPC ......... *H01M 2/1241* (2013.01); *H01M 2/022* (2013.01); *H01M 2/0413* (2013.01);
(Continued)

(58) Field of Classification Search
CPC .. H01M 2/022; H01M 2/1235; H01M 2/1282; H01M 2/0413; H01M 2/1241; H01M 2200/20; H01M 2/0257; H01M 2/025; H01M 10/0525; H01M 10/04; Y10T 29/4911

See application file for complete search history.

(56) References Cited

U.S. PATENT DOCUMENTS 3,473,965 A   10/1969  La Barge
4,053,687 A   10/1977  Coibion et al.
(Continued)

FOREIGN PATENT DOCUMENTS

KR   20090105547   10/2009

OTHER PUBLICATIONS

Bolobov et al., Cobustion Explosion and Shockwaves vol. 34 No. 2 1998 pp. 159-162.
(Continued)

*Primary Examiner* — Patrick Ryan
*Assistant Examiner* — Aaron Greso
(74) *Attorney, Agent, or Firm* — Garlick & Markison; Bruce E. Garlick

(57) ABSTRACT

A battery cell design is disclosed that provides a predictable pathway through a portion of the cell (e.g., the cell cap assembly) for the efficient release of the thermal energy that occurs during thermal runaway, thereby reducing the chances of a rupture in an undesirable location. Furthermore the disclosed design maintains the functionality of the cell cap as the positive terminal of the cell, thereby having minimal impact on the manufacturability of the cell as well as its use in a variety of applications.

17 Claims, 6 Drawing Sheets

Related U.S. Application Data

(60) Provisional application No. 61/532,028, filed on Sep. 7, 2011.

(51) Int. Cl.
*H01M 2/04* (2006.01)
*H01M 10/0525* (2010.01)
*H01M 10/04* (2006.01)

(52) U.S. Cl.
CPC ....... *H01M 2/0456* (2013.01); *H01M 2/1235* (2013.01); *H01M 2/1282* (2013.01); *H01M 10/04* (2013.01); *H01M 10/0525* (2013.01); *H01M 2200/20* (2013.01); *Y10T 29/4911* (2015.01)

(56) References Cited

U.S. PATENT DOCUMENTS

| | | | |
|---|---|---|---|
| 7,927,739 B2 | 4/2011 | Issaev et al. | |
| 8,088,511 B2 | 1/2012 | Hermann et al. | |
| 2002/0018926 A1* | 2/2002 | Shiga | H01M 4/13 429/61 |
| 2003/0180582 A1* | 9/2003 | Masumoto | H01M 2/1066 429/7 |
| 2004/0038126 A1 | 2/2004 | Gu | |
| 2004/0154160 A1 | 8/2004 | Hong | |
| 2004/0157115 A1* | 8/2004 | Bouffard | H01M 2/1223 429/56 |
| 2005/0174092 A1* | 8/2005 | Dougherty | H01M 2/1077 320/128 |
| 2006/0093895 A1* | 5/2006 | Lim | H01M 2/1229 429/53 |
| 2008/0052900 A1* | 3/2008 | Kondo | H01M 10/44 29/623.2 |
| 2008/0131767 A1* | 6/2008 | Kim | H01M 2/0426 429/163 |
| 2009/0159354 A1* | 6/2009 | Jiang | H01M 2/206 180/68.5 |
| 2010/0136385 A1 | 6/2010 | Hermann et al. | |
| 2010/0136387 A1 | 6/2010 | Kohn et al. | |
| 2010/0136407 A1 | 6/2010 | Beecher et al. | |
| 2010/0136409 A1 | 6/2010 | Straubel et al. | |
| 2010/0136421 A1 | 6/2010 | Hermann et al. | |
| 2010/0136424 A1 | 6/2010 | Hermann et al. | |
| 2010/0143772 A1* | 6/2010 | Byun | H01M 2/0413 429/82 |
| 2010/0215997 A1 | 8/2010 | Byun et al. | |
| 2010/0316894 A1 | 12/2010 | Hermann et al. | |
| 2011/0014506 A1 | 1/2011 | Hermann et al. | |
| 2011/0014514 A1 | 1/2011 | Mehta et al. | |
| 2011/0117403 A1 | 5/2011 | Hermann et al. | |
| 2011/0262783 A1 | 10/2011 | Mehta | |
| 2013/0059181 A1 | 3/2013 | LePort et al. | |

OTHER PUBLICATIONS

Nazimova et al. (Plenum Publishing Corporation 1979) Translated from Zhurnal Prikladnoi Spectro.skopii, vol. 30, No. 6, pp. 991-994, Jun. 1979.

* cited by examiner

BATTERY CAP ASSEMBLY WITH HIGH EFFICIENCY VENT

CROSS REFERENCE TO RELATED APPLICATIONS

This application claims the benefit of U.S. Provisional Application No. 61/532,028, filed Sep. 7, 2011, and of U.S. patent application Ser. No. 13/567,876, filed Aug. 6, 2012, the contents of each of which are expressly incorporated by reference thereto in its entirety for all purposes.

FIELD OF THE INVENTION

The present invention relates generally to rechargeable battery cells and, more particularly but not exclusively, to a modified closure assembly (e.g., cell cap) that allows for efficient release of cell contents during thermal events.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Batteries can be broadly classified into primary and secondary batteries. Primary batteries, also referred to as disposable batteries, are intended to be used until depleted, after which they are simply replaced with one or more new batteries. Secondary batteries, more commonly referred to as rechargeable batteries, are capable of being repeatedly recharged and reused, therefore offering economic, environmental and ease-of-use benefits compared to a disposable battery.

Although rechargeable batteries offer a number of advantages over disposable batteries, this type of battery is not without certain drawbacks. In general, most of the disadvantages associated with rechargeable batteries are due to the battery chemistries employed, as these chemistries tend to be less stable than those used in primary cells. Due to these relatively unstable chemistries, secondary cells often require special handling during fabrication. Additionally, secondary cells such as lithium-ion cells tend to be more prone to thermal events, such as thermal runaway, than primary cells, thermal runaway occurring when an internal reaction rate increases to a point that more heat is being generated than can be safely dissipated, leading to a further increase in both reaction rate and heat generation. Eventually the amount of generated heat is great enough to lead to the combustion of the battery, which can lead to further combustion of materials in proximity to the battery. Thermal runaway may be initiated by a short circuit within the cell, improper cell use, physical abuse, manufacturing defects, or exposure of the cell to extreme external temperatures.

Thermal runaway is of major concern since a single incident can lead to significant property damage and, in some circumstances, bodily harm or loss of life. When a battery undergoes thermal runaway, it typically emits a large quantity of smoke, jets of flaming liquid electrolyte, and sufficient heat to lead to the combustion and destruction of materials in close proximity. If the cell undergoing thermal runaway is surrounded by one or more additional cells as is typical in a battery pack, then a single thermal runaway event can quickly lead to the thermal runaway of multiple cells which, in turn, can lead to much more extensive collateral damage. Regardless of whether a single cell or multiple cells are undergoing this phenomenon, if the initial fire is not extinguished immediately, subsequent fires may be caused that dramatically expand the degree of property damage. For example, the thermal runaway of a battery within an unattended laptop will likely result in not only the destruction of the laptop, but also at least partial destruction of its surroundings, e.g., home, office, car, laboratory, and the like. If the laptop is on-board an aircraft, for example within the cargo hold or a luggage compartment, the ensuing smoke and fire may lead to an emergency landing or, under more dire conditions, a crash landing. Similarly, the thermal runaway of one or more batteries within the battery pack of a hybrid or electric vehicle may destroy not only the car, but may lead to a collision if the car is being driven, or the destruction of its surroundings if the car is parked.

One approach to overcoming this problem is by reducing the risk of thermal runaway. For example, to prevent batteries from being shorted out during storage and/or handling, precautions can be taken to ensure that batteries are properly stored, for example by insulating the battery terminals and using specifically designed battery storage containers. Another approach to overcoming the thermal runaway problem is to develop new cell chemistries and/or modify existing cell chemistries. For example, research is currently underway to develop composite cathodes that are more tolerant of high charging potentials. Research is also underway to develop electrolyte additives that form more stable passivation layers on the electrodes. Although this research may lead to improved cell chemistries and cell designs, currently this research is only expected to reduce, not eliminate, the possibility of thermal runaway.

FIG. 1 is a cross-sectional view of a conventional cell and cap assembly commonly used with lithium ion batteries employing the 18650 form-factor. Battery 100 includes a cylindrical case 101, an electrode assembly 103, and a cap assembly 105. Case 101 is typically made of a metal, such as nickel-plated steel, that has been selected such that it will not react with the battery materials, e.g., the electrolyte, electrode assembly, etc. For an 18650 cell, case 101 is often referred to as a can as it is comprised of a cylinder and an integrated, i.e., seamless, bottom surface 102. Electrode assembly 103 is comprised of an anode sheet, a cathode sheet and an interposed separator, wound together in a spiral pattern often referred to as a 'jelly-roll'. An anode electrode tab 107 connects the anode electrode of the wound electrode assembly to the negative terminal which, for an 18650 cell, is case 101. A cathode tab 109 connects the cathode electrode of the wound electrode assembly to the positive terminal via cap assembly 105. Typically battery 100 also includes a pair of insulators 111/113 located on either end of electrode assembly 103 to avoid short circuits between assembly 103 and case 101.

In a conventional cell, cap assembly 105 is a relatively complex assembly that includes multiple safety mechanisms. In cell 100, tab 109 is connected to assembly 105 via a current interrupt device (CID). The purpose of the CID is to break the electrical connection between the electrode assembly and the positive terminal if the pressure within the cell exceeds a predetermined level. Typically such a state of over pressure is indicative of cell overcharging or of the cell temperature increasing beyond the intended operating range of the cell, for example due to an extremely high external temperature or due to a failure within the battery or charging system. Although other CID configurations are known, in the illustrated cell the CID is comprised of a lower member 115 and an upper member 116. Members 115 and 116 are electrically connected, for example via crimping along their periphery. Lower member 115 includes multiple openings 117, thus insuring that any pressure changes within case 101 are immediately transmitted to upper CID member 116. The central region of upper CID member 116 is scored (not visible in FIG. 1) so that when the pressure within the cell exceeds the predetermined level, the scored portion of member 116 breaks free, thereby disrupting the continuity between the electrode assembly 103 and the battery terminal.

Under normal pressure conditions, lower CID member 115 is coupled by a weld 119 to electrode tab 109 and upper CID member 116 is coupled by a weld 121 to safety vent 123. In addition to disrupting the electrical connection to the electrode assembly during an over pressure event, the CID in conjunction with safety vent 123 are designed to allow the gas to escape the cell in a somewhat controlled manner. Safety vent 123 may include scoring 125 to promote the vent rupturing in the event of over pressure.

The periphery of CID members 115/116 are electrically isolated from the periphery of safety vent 123 by an insulating gasket 126. As a consequence, the only electrical connection between CID members 115/116 and safety vent 123 is through weld 121.

Safety vent 123 is coupled to battery terminal 127 via a positive temperature coefficient (PTC) current limiting element 129. PTC 129 is designed such that its resistance becomes very high when the current density exceeds a predetermined level, thereby limiting short circuit current flow. Cap assembly 105 further includes a second insulating gasket 131 that insulates the electrically conductive elements of the cap assembly from case 101. Cap assembly 105 is held in place within case 101 using crimped region 133.

Elements 115, 116 and 123 must be fabricated from a material that does not react with the electrolyte used in the electrode assembly. Accordingly, for a conventional lithium ion cell, these elements cannot be fabricated from steel. Typically they are fabricated from aluminum. In contrast, terminal 127 is generally fabricated from steel, thus allowing resistance welding to be used to attach a conductor to the terminal.

In a conventional cell, such as the cell shown in FIG. 1, a variety of different abusive operating/charging conditions and/or manufacturing defects may cause the cell to enter into thermal runaway, where the amount of internally generated heat is greater than that which can be effectively withdrawn. As a result, a large amount of thermal energy is rapidly released, heating the entire cell up to a temperature of 900° C. or more and causing the formation of localized hot spots where the temperature may exceed 1500° C. Accompanying this energy release is the release of gas, causing the gas pressure within the cell to increase.

To combat the effects of thermal runaway, a conventional cell will typically include a venting element within the cap assembly such as that previously shown and described. The purpose of the venting element is to release, in a somewhat controlled fashion, the gas generated during the thermal runaway event, thereby preventing the internal gas pressure of the cell from exceeding its predetermined operating range. Unfortunately in a conventional cell, the cell wall may still perforate (e.g., at site 141) due to the size of the vent, the material characteristics of the cell wall, and the flow of hot gas traveling along the cell wall as it rushes towards the ruptured vent. Once the cell wall is compromised, i.e., perforated, collateral damage can quickly escalate, due both to the unpredictable location of such a hot spot and due to the unpredictable manner in which such cell wall perforations grow and affect neighboring cells. For example, if the cell is one of a large array of cells comprising a battery pack, the jet of hot gas escaping the cell perforation may heat the adjacent cell to above its critical temperature, causing the adjacent cell to enter into thermal runaway. Accordingly, it will be appreciated that the perforation of the wall of one cell during thermal runaway can initiate a cascading reaction that can spread throughout the battery pack. Furthermore, even if the jet of hot gas escaping the cell perforation from the first cell does not initiate thermal runaway in the adjacent cell, it may still affect the health of the adjacent cell, for example by weakening the adjacent cell wall, thereby making the adjacent cell more susceptible to future failure.

One challenge to altering cell design when addressing these issues is that battery cell manufacturers produce enormous volumes of battery cells. Part of the manufacturing process includes "burn-in," testing, and other operational functions that make use of existing processes and equipment. These processes and equipment depend upon a particular form factor for the battery cell. Even under circumstances when a customer is able to use a second form factor for the battery cell that can address the identified issues during in-field operation, adoption of the second form factor is problematic unless the manufacturer environment is considered and accounted for.

Accordingly, what is needed is a cell design that can help maintain cell wall integrity during a thermal event by efficiently allowing hot gas and debris to exit the cell via the cap. The present invention provides such a cell design.

BRIEF SUMMARY OF THE INVENTION

Disclosed is a system and method for a battery cell design that provides a pathway through a predefined region (e.g., the cell cap assembly) for the efficient release of thermal energy that occurs during thermal runaway, thereby reducing the chances of a cell side wall rupture/perforation. Furthermore the disclosed design maintains the functionality of the cell cap as the positive terminal of the cell, thereby having minimal impact on the manufacturability of the cell as well as its use in a variety of applications.

The following summary of the invention is provided to facilitate an understanding of some of technical features related to controlled ejectment of combustion material from a battery cell near or at thermal runaway, and is not intended to be a full description of the present invention. A full appreciation of the various aspects of the invention can be gained by taking the entire specification, claims, drawings, and abstract as a whole. The present invention is applicable to other cell designs and cell chemistries.

A battery cell, including an electrode assembly having a cathode and an anode with the electrode assembly constructed of materials that combust under a plurality of combustion conditions to generate a combustion material having a plurality of combustion material properties including a combustion material temperature and a combustion material pressure; a closed case having a base, a crown, and a side wall extending from the base to the crown with the case defining a cavity therein containing the electrode assembly, the case providing a first external electrical contact electrically communicated to the cathode and a second external electrical contact electrically communicated to the anode; wherein a portion of the closed case defines an ejection structure, responsive to one or more particular combustion material properties of the plurality of combustion material properties, providing an ejectment aperture at a predefined location that directs the combustion material in a predetermined direction.

A method for ejecting combustion material from a battery cell, including a) enclosing an electrode assembly within a closed case, the electrode assembly having a cathode and an anode with the electrode assembly constructed of materials that combust under a plurality of combustion conditions to generate a combustion material having a plurality of combustion material properties including a combustion material temperature and a combustion material pressure; b) defining an ejectment structure within a portion of the closed case; and c) responding to one or more particular combustion material properties of the plurality of combustion material properties to provide an ejectment aperture at a predefined location that directs the combustion material out of the closed case in a predetermined direction.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

A further understanding of the nature and advantages of the present invention may be realized by reference to the remaining portions of the specification and the drawings.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
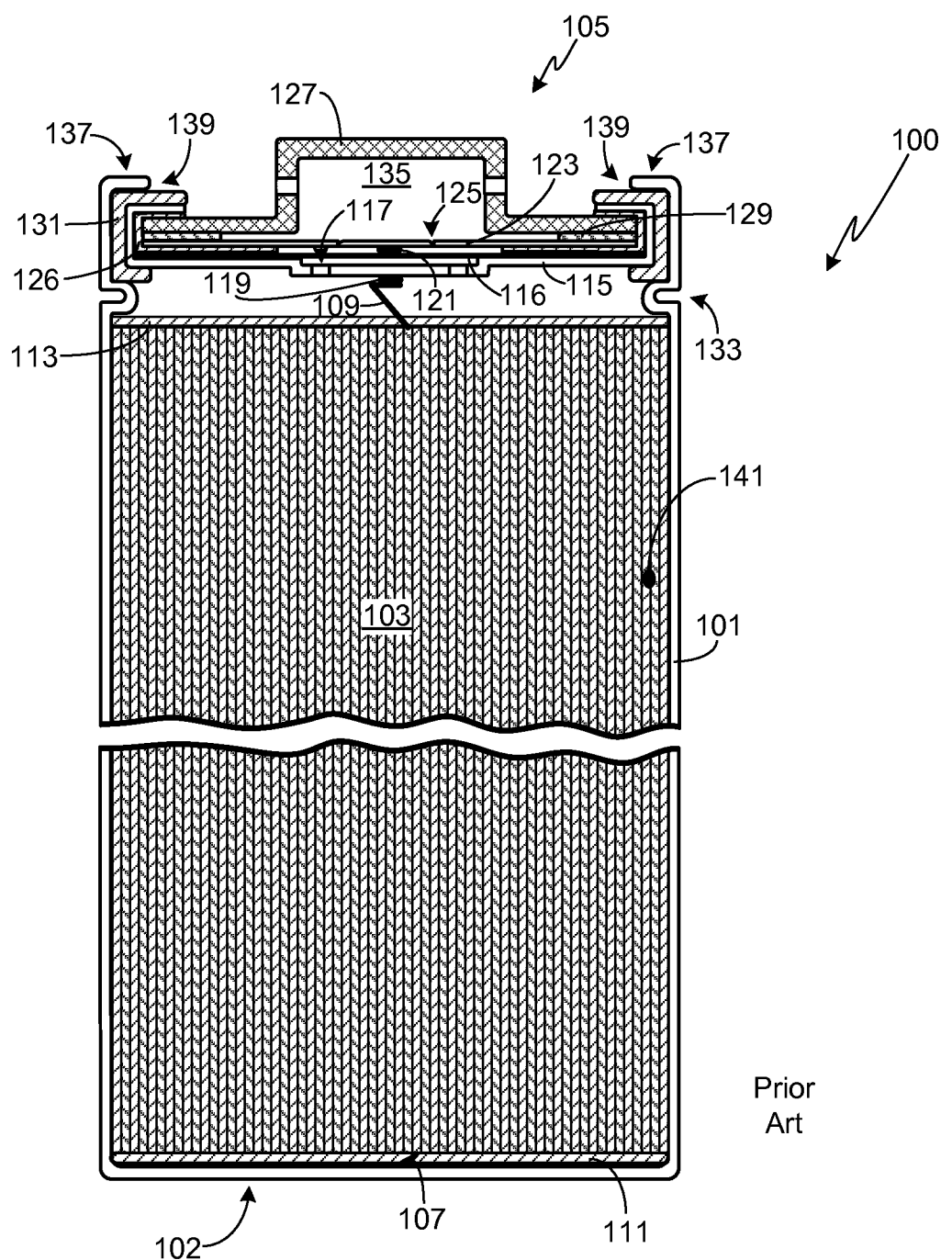
FIG. 1 is a simplified cross-sectional illustration of a cell utilizing the 18650 form-factor.

Embodiments of the present invention provide a system and method for a system and method for a battery cell design that provides a pathway through a predefined region (e.g., the cell cap assembly) for the efficient release of thermal energy that occurs during thermal runaway, thereby reducing the chances of a cell side wall rupture/perforation. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In a general description of the present invention, an electrode assembly (or other component) within a closed case (as used herein, "closed" includes gas release vents but otherwise sufficiently sealed such that pressure may accumulate) will combust under a set of conditions. The combustion produces a combustion material that is a combination of one or more gases and/or physical debris. The combustion material and internal combustion process includes one or more combustion material properties, such as a combustion temperature, a combustion pressure, and the like. Preferred embodiments provide mechanical response to one or more preselected combustion material properties by defining a special ejectment structure in a portion of the closed case. The ejectment structure responds to the one or more preselected combustion material properties and provides an ejectment aperture. The ejectment aperture permits ejectment of the combustion material from a predetermined location away from the closed case at a predetermined direction.

One particular implementation includes collections of large numbers of cylindrical battery cells into a battery pack. Efficient packing and electrical contact requirements results in packing the cells into arrays with a side wall of one battery cell adjacent one or more other battery cells, and all the ends of the battery cells exposed because each end typically includes an electrical contact. To simplify the discussion of the present invention, the following description contemplates use of generally cylindrical battery cells such as described in FIG. 1 and with the ejectment structure included as part of a cell cap assembly. In this way, the ejectment structure defines the ejectment aperture at one of the ends and directs the ejectment out of the end and away from other adjacent battery cells. Thus in this context, one or more embodiments of the present invention may utilize (i) a cell cap that clears away during thermal runaway, (ii) a cell cap that is optimized for mechanical removal prior to cell use, and/or (iii) a cell cap geometry optimized for the ejection of runaway gas and matter.

One embodiment consists of a cell cap constructed of a low melting point electrically-conductive material, such as aluminum, which will melt in the event of thermal runaway (e.g., at temperatures in excess of ~1000° C.), thereby clearing a wider and lower restriction path for the ejection of gas and/or debris (e.g., combustion material). The side wall is constructed of a higher melting point material (e.g., stainless steel or other). The geometry of this cell cap may be similar to prior art assemblies (for example, as shown in FIG. 1), or modified as described below.

Figure 2:
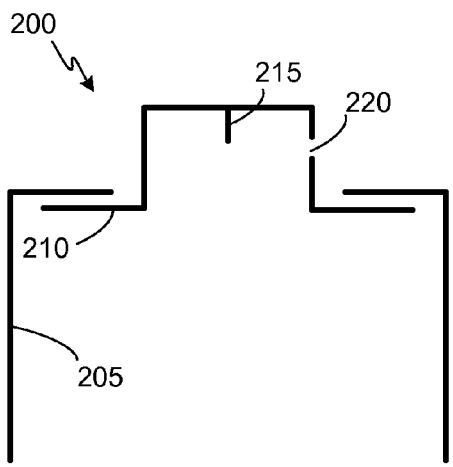
FIG. 2 illustrates a ribbed cell cap.

In one embodiment, the cell cap is made from aluminum (or similar material). Preferably in this embodiment the PTC element is eliminated and the cell cap is coined and made thicker in the ring portion, thereby replacing the PTC element. Additionally, the aluminum cell cap may be thinned and ribbed (e.g., FIG. 2) to provide additional stiffness and increase ultrasonic bondability while minimizing the amount of material which would need to melt during a runaway event. FIG. 2 illustrates a ribbed cell cap 200 including a side wall 205, a bonding legs 210, one or more structural ribs 215, and one or more vents 220. Legs 210 are joined to side wall 205, such as by use of bonding, welding, and other attachment processes.

Figure 3:
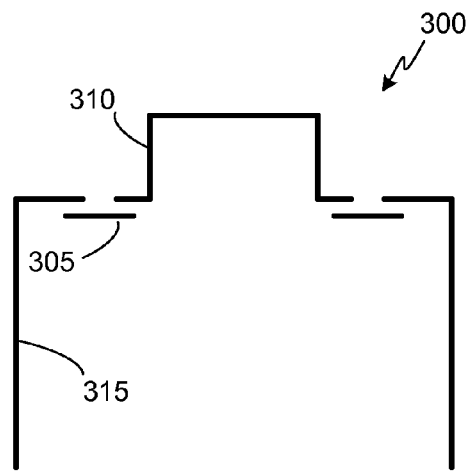
FIG. 3 illustrates a two part cell cap comprising a top portion and a ring portion.

In another embodiment illustrated in FIG. 3, a cell cap 300 includes two pieces, a ring 305 and a top 310, joined to a side wall 315. One component, e.g., ring 305 may be made out of a low melting point material, such as aluminum, while the other component, e.g., top 310, may be made out of a more robust and weldable material, such as steel. The low melting point ring 305 would melt during runaway, releasing steel top 310. Conversely, top 310 can be made from a low melting point material, while ring 305 is made from a more robust material. In this case, top 310 would melt, clearing a path for ejecting combustion material. Ring 305 can be bonded to top 310 and to side wall 315 by laser welding, ultrasonic welding, friction welding, and the like.

Figure 4:
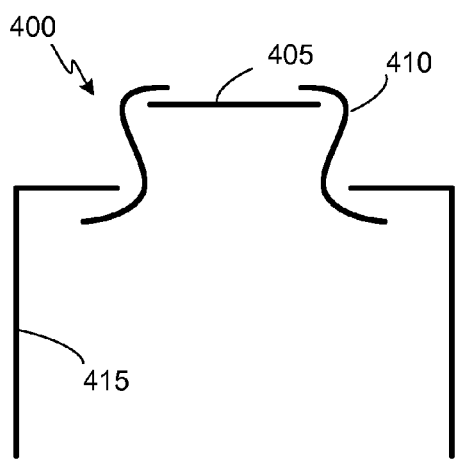
FIG. 4 illustrates a crimped plate within the cell cap assembly.

In a similar embodiment shown in FIG. 4, a cell cap 400 includes a top plate 405 that is crimped to a body 410 of cap 400, prior to crimping the cell cap assembly into the battery cell by attachment (e.g., crimping) to a side wall 415. This embodiment may also include cell cap 400 made from composite materials, some of which may melt during thermal runaway (e.g., top plate 405 or body 410) made from a lower melting point material than material used in side wall 415). In this embodiment, the attachment mechanism (e.g., crimps) could be pressure responsive to release top plate 405 when a combustion pressure within the cell reaches a predetermined value to limit rupture/perforation of side wall 415.

In a modification of the embodiment shown in FIG. 4, top plate 405 may be configured to snap into the body 410 of the cell cap during manufacturing. This cell cap may then be removed at a subsequent time, for example prior to use in a specific application. Preferably the top plate 405 is reusable. One way to remove top plate 405 would be use of a particular mechanical interface, such as the mechanical interface described below in connection with FIG. 6-FIG. 8. This implementation may be considered a form factor adapter, allowing the cell to effectively have two different form factors-one for manufacturing and another for use. In some cases, the adapter may be re-used, either with the battery cell from which it was removed or with a "new" battery cell having a matching (or complementary) form factor.

Figure 5:
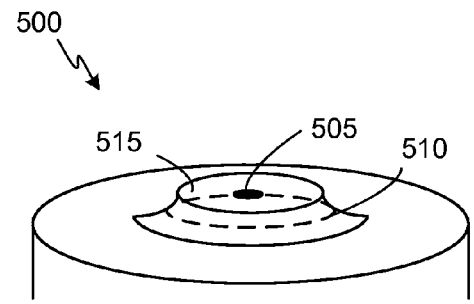
FIG. 5 illustrates a scored and perforated cell cap.

In another embodiment illustrated in FIG. 5, a cell cap 500 is modified so that it will release or hinge out of the way during a thermal runaway event. In this embodiment, preferably cell cap 500 is sealed over a vent plate. Cell cap 500 includes a hole 505 that is sized to allow gas to escape during operation of the cell vent prior to runaway, but is small enough to insure that pressure will build up within cell cap 500 during runaway. Once the pressure within the assembly reaches a predefined value, cell cap 500 breaks away to provide an ejectment aperture with a large path for combustion material to exit the cell. Preferably a scoring 510 is used to insure that a top portion 515 breaks away at the desired location and pressure. Scoring 510 is a mechanical weakness that may be introduced through etching, mechanical scribing, lasing, or other mechanism to selectively pattern the material to a predetermined depth sufficient to mechanically fail at the desired pressure to produce the desired ejectment aperture. In this case, top portion hinges or completely releases from scoring 510. The disclosed use of materials with dissimilar melting points may also be implemented in this configuration.

Figure 6:
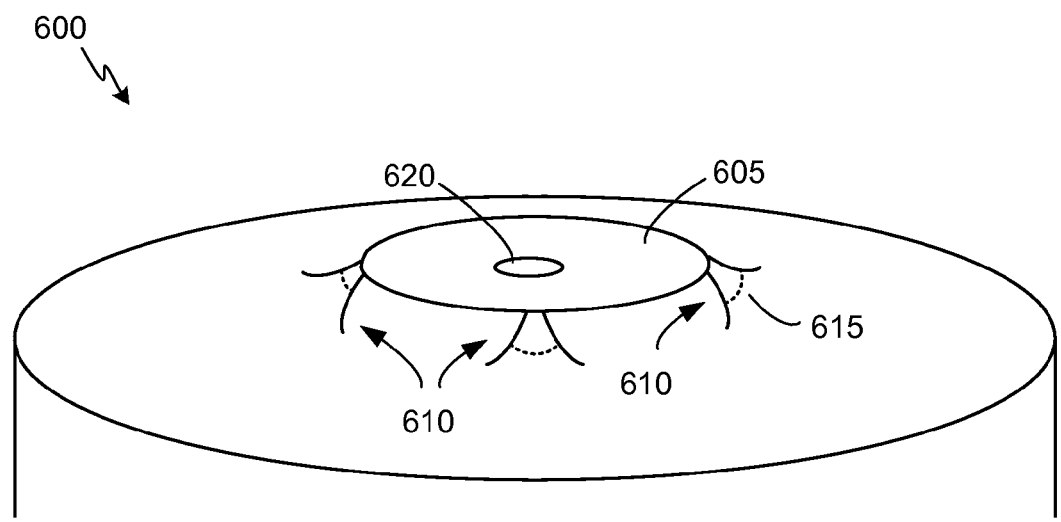
FIG. 6 illustrates a cell cap designed to be removed.
Figure 7:
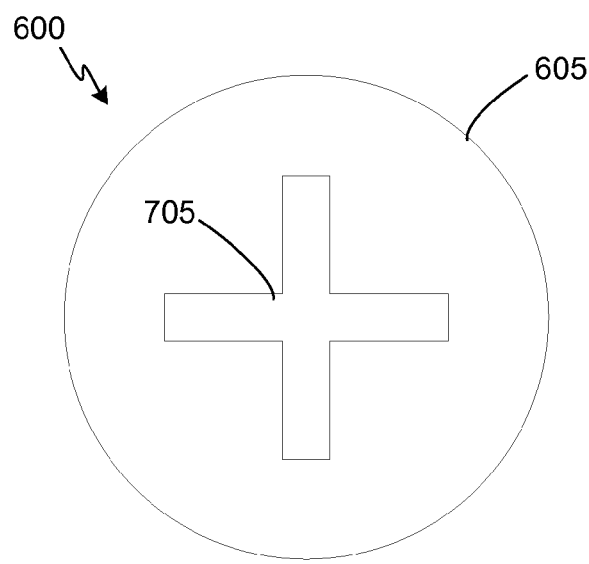
FIG. 7 illustrates a cut-out that may be used with the cell cap shown in FIG. 6 to aid insertion of a tool for cell cap removal.

In another embodiment illustrated in FIG. 6, an end cap assembly 600 includes a cell cap 605 held in place with a plurality of legs 610. Each leg 610 includes a scoring 615. This design allows the cell to include a first form factor to be manufactured and processed using current and conventional manufacturing equipment while still providing a simple mechanism for removing cell cap 605 at some later time, the removal could provide a second form factor. Cell cap 605 may be removed by pulling or twisting or other manipulation. Preferably cell cap 605 includes a mechanical interface 620 (e.g., a special shape cut-out of, or otherwise formed in, cell cap 605), allowing insertion of a tool that can be used to remove cap 605. FIG. 7 illustrates a representative shape 705 for interface 620 in cell cap 605, but other shapes, configurations, orientations are possible, which may be dependent upon providing sufficient removal torque or force to release cell cap 605.

Figure 8:
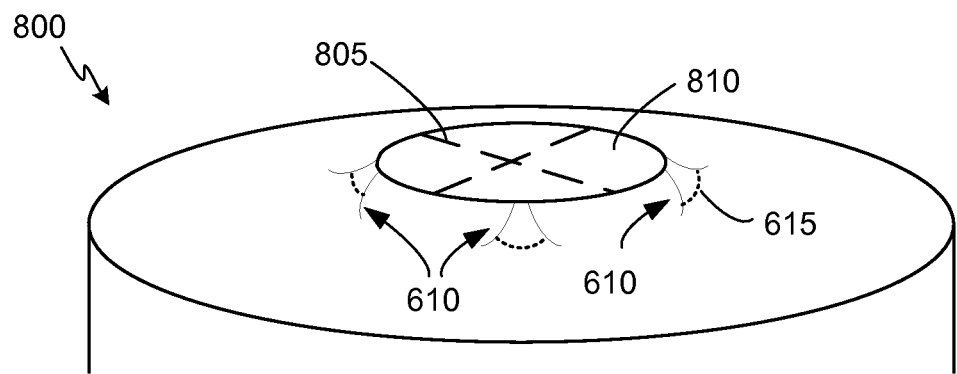
FIG. 8 illustrates a cell cap that includes a cross-shaped scoring, thus providing means for easily punching a hole into the cell cap of the cell.
Figure 9:
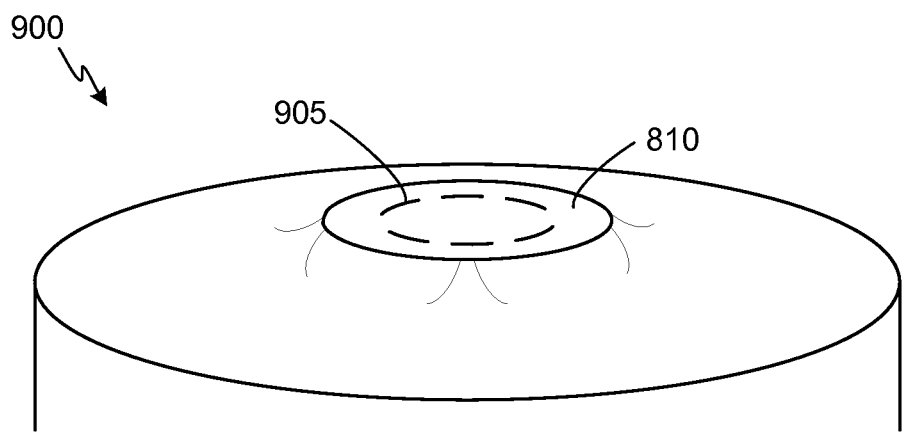
FIG. 9 illustrates a cell cap that includes a circularly-shaped scoring, thus providing means for easily punching a hole into the cell cap of the cell.

Various shapes could be used for mechanical interface, such as an alternative that shown in FIG. 8. A cap removal tool preferably enters cap assembly 600 via interface 620 (or 705) and then either expands or is twisted, thus allowing the tool to grab onto the cap. FIG. 8 illustrates a cell cap assembly 800 that includes a cross-shaped scoring 805. Scoring 805 provides a mechanism for easily punching a hole into a cell cap 805 of the cell. In cell cap assembly 800, it is not required that legs 610 and/or scoring 615 be provided as scoring 805 makes it easier to mechanically produce a desired ejectment aperture before the cell is installed for use while preserving manufacturing requirements. Cell cap 810 is scored with scoring interface 805 such that a hole may be punched into or otherwise form with respect to cell cap 810 prior to use, if desired. FIG. 8 illustrates a cross-shaped scoring pattern for scoring 805 and FIG. 9 illustrates a circularly-shaped scoring pattern 905.

Figure 10:
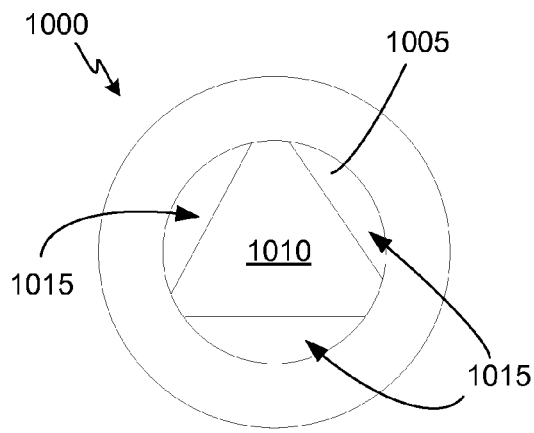
FIG. 10 illustrates a modified cell cap geometry.
Figure 11:
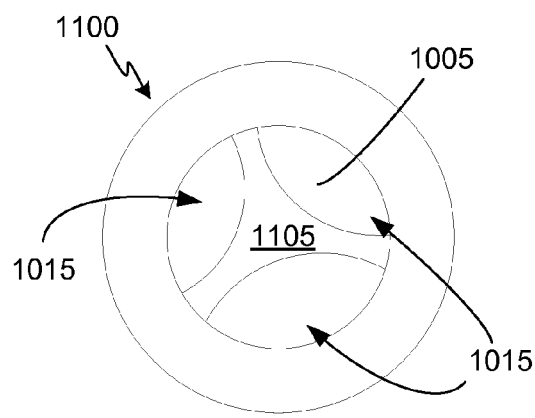
FIG. 11 illustrates an alternate modified cell cap geometry.
Figure 12:
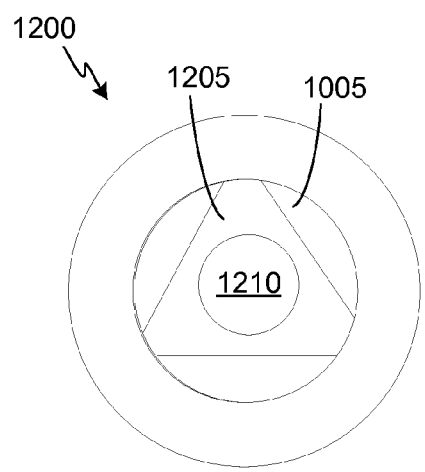
FIG. 12 illustrates an alternate modified cell cap geometry.

FIGS. 10-13 provide a top-down view of a cell with four different cap geometries designed to provide improved ejection of gas and debris. These cap geometries may be used alone or in combination with the embodiments described above. In these embodiments, a three-sided contact plate overlies a generally circular ejectment region. The contact plate is so referred to herein as it often provides a desired electrical contact interface. FIG. 10 illustrates a modified cell cap geometry 1000 in which an ejectment region 1005 has an overlying three-sided contact plate 1010 to form three apertures 1015. Contact plate 1010 includes straight-edges. FIG. 11 illustrates an alternate modified cell cap geometry 1100 having a three-sided contact plate 1105 in which the three edges are arcuate. FIG. 12 illustrates an alternate modified cell cap geometry 1200 similar to FIG. 10 in which a three-sided contact plate 1205 includes an additional circular aperture 1210 centered over ejectment region 1005.

Figure 13:
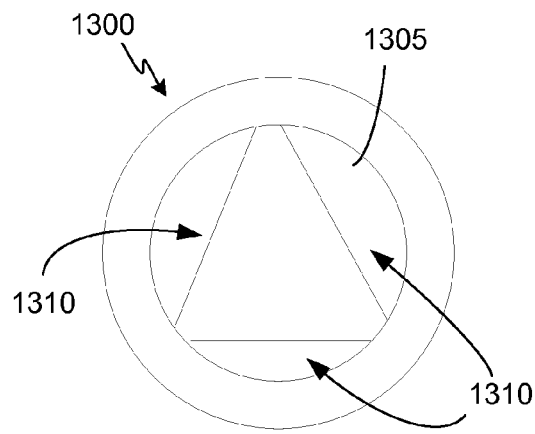
FIG. 13 illustrates an alternate modified cell cap geometry.
Figure 14:
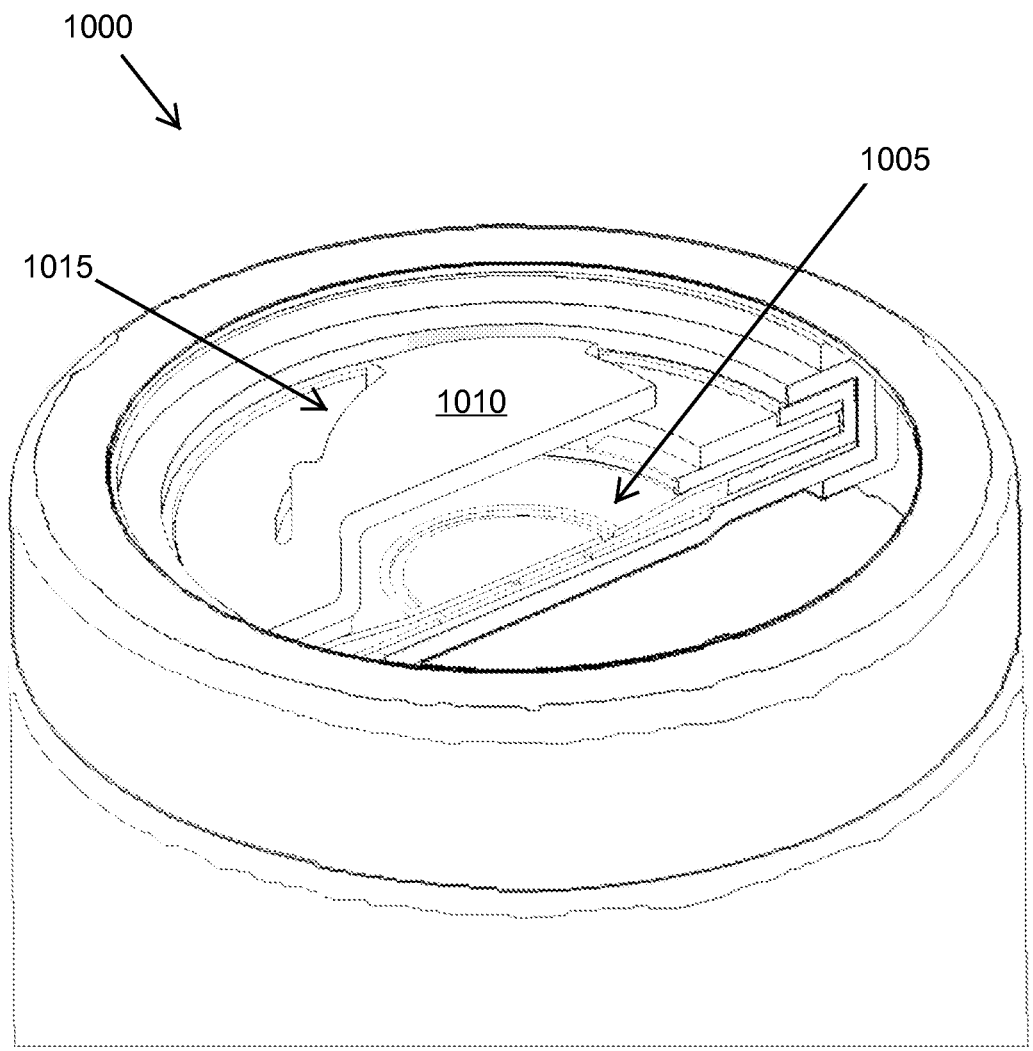
FIG. 14 illustrates a perspective view of a cell cap geometry.

FIG. 13 illustrates an alternate modified cell cap geometry 1300 similar to FIG. 10 in which an ejectment region 1305 is larger, allowing larger ejectment apertures 1310 to be formed by an overlying three-sided contact plate 1315. In some embodiments, other regular or irregular shapes for the contact plate and/or ejectment region is possible, with use of one or more additional apertures such as additional aperture 1205 (which is not necessarily circular) included in the various geometries. FIG. 14 illustrates a perspective view of a portion of cell cap geometry 1000 shown in FIG. 10. In one implementation, ejectment region is manufactured of aluminum or other material having a lower melting point than the side wall material. In other implementations, scoring or other ejectment structures as described herein, may be used in ejectment region 1005.

Although the preferred embodiment of the invention is utilized with a cell using the 18650 form-factor, it will be appreciated that the invention can be used with other cell designs, shapes and configurations.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A method, comprising:
    a) enclosing an electrode assembly for a battery cell within a closed case having a cylindrical shape and formed by a base, a cell cap assembly, and a side wall extending from the base to the cell cap assembly with the closed case defining a cavity therein containing the electrode assembly, the electrode assembly having a cathode and an anode with the electrode assembly constructed of materials that combust under a plurality of combustion conditions to generate a combustion material having a plurality of combustion material properties including a combustion material temperature and a combustion material pressure; and
    b) defining an ejectment structure within the cell cap assembly, the ejectment structure concentrically oriented with a top plate of the cell cap assembly and responsive to one or more particular combustion material properties of the plurality of combustion material properties directs the combustion material out of an ejectment aperture in a predetermined direction.

2. The method of claim 1 wherein the closed case includes a width dimension, a height dimension, and a length dimension, a largest of the dimensions generally parallel to the side wall of the closed case, wherein an electrical contact is provided at the top plate of the cell cap assembly and the electrical contact defines a first form factor for operation of the battery cell; the method further comprising:

c) disposing removably an adapter over both the cell cap assembly and the ejectment structure with the adapter reconfiguring the cell cap assembly to provide a second form factor different from the first form factor with the second form factor used for manufacturing and testing.

3. The method of claim 2 further comprising:
d) removing the adapter prior to use of the battery cell in a battery pack.

4. The method of claim 3 further comprising:
e) reusing the adapter to reconfigure another cell cap assembly of a subsequent battery cell and provide the second form factor for the subsequent battery cell.

5. The method of claim 4 wherein the subsequent battery cell includes the battery cell.

6. The method of claim 1, wherein defining the ejectment structure comprises configuring the ejectment structure to mechanically respond to the particular combustion material properties to open the ejectment aperture of the ejectment structure at a first pressure and wherein the side wall is configured to mechanically be perforated by the combustion material at a second pressure that is greater than the first pressure.

7. The method of claim 1 wherein the ejectment structure includes a first material that melts at a first temperature and wherein the side wall includes a second material that melts at a second temperature higher than the first temperature.

8. The method of claim 7 wherein the first material includes aluminum and wherein the second material includes stainless steel.

9. The method of claim 7 wherein the cell cap assembly includes an exterior wall of the first material having a thickness configured to improve a mechanical failure response to the first temperature and wherein the exterior wall includes a mechanical reinforcement to improve structural integrity of the cell cap assembly.

10. The method of claim 7 wherein the cell cap assembly is attached to the side wall using an attachment structure and wherein the attachment structure includes the first material and the cell cap assembly includes the second material.

11. The method of claim 7 wherein the cell cap assembly is attached to the side wall using an attachment structure and wherein the attachment structure includes the second material and the cell cap assembly includes the first material.

12. The method of claim 1 further comprising providing a score in the cell cap assembly, the score configured to fail at a first pressure and wherein the side wall is configured to fail at a second pressure that is greater than the first pressure.

13. The method of claim 12 wherein the cell cap assembly includes an end wall having a generally circular perimeter, and wherein the score is provided as a mechanical scribe of a generally circular controlled depth on the end wall.

14. The method of claim 12 wherein the cell cap assembly includes an end wall retained to the top plate using one or more legs and wherein the score is provided as a mechanical scribe of a controlled depth on the one or more legs.

15. The method of claim 1 wherein an electrical contact of the closed case includes a three-sided contact plate and wherein the cell cap assembly defines the ejectment structure by a generally circular ejectment region with the three-sided contact plate overlying the generally circular ejectment region.

16. The method of claim 15 wherein the three-sided contact plate includes three generally linear edges or three generally arcuate edges.

17. The method of claim 15 wherein the three-sided contact plate includes a circular aperture generally centered over the generally circular ejectment region.

\* \* \* \* \*